US009294477B1

(12) United States Patent
Bugenhagen (10) Patent No.: US 9,294,477 B1
(45) Date of Patent: Mar. 22, 2016

(54) MEDIA ACCESS CONTROL ADDRESS SECURITY

(75) Inventor: Michael K. Bugenhagen, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1662 days.

(21) Appl. No.: 11/417,371

(22) Filed: May 4, 2006

(51) Int. Cl.
*H04L 29/06* (2006.01)

(52) U.S. Cl.
CPC ................................. *H04L 63/0876* (2013.01)

(58) Field of Classification Search
CPC .................................................. H04L 63/0876
USPC ................................................. 709/227, 226
See application file for complete search history.

(56) References Cited

U.S. PATENT DOCUMENTS

| 5,173,939 | A | * | 12/1992 | Abadi et al. ...................... 707/9 |
| 5,432,785 | A | * | 7/1995 | Ahmed et al. ................. 370/231 |
| 5,583,864 | A | * | 12/1996 | Lightfoot et al. ............. 370/396 |
| 6,219,706 | B1 | * | 4/2001 | Fan et al. ....................... 709/225 |
| 6,675,225 | B1 | * | 1/2004 | Genty ................ H04L 12/4641 709/239 |
| 6,693,878 | B1 | * | 2/2004 | Daruwalla et al. ............ 370/235 |
| 6,771,673 | B1 | * | 8/2004 | Baum et al. .................... 370/535 |
| 7,143,188 | B2 | * | 11/2006 | Maufer .................. H04L 29/06 709/245 |
| 7,440,415 | B2 | * | 10/2008 | Wild et al. ..................... 370/254 |
| 7,496,662 | B1 | * | 2/2009 | Roesch ............... H04L 63/1433 709/223 |
| 7,529,243 | B2 | * | 5/2009 | Sodder et al. ................. 370/392 |
| 7,623,548 | B2 | * | 11/2009 | Gilmartin ..................... 370/468 |
| 8,068,414 | B2 | * | 11/2011 | Huegen et al. ................ 370/230 |
| 2002/0021675 | A1 | * | 2/2002 | Feldmann ..................... 370/254 |
| 2002/0186698 | A1 | * | 12/2002 | Ceniza ............... H04L 12/4641 370/401 |
| 2003/0106067 | A1 | * | 6/2003 | Hoskins .............. H04L 12/2801 725/119 |
| 2004/0088542 | A1 | * | 5/2004 | Daude et al. .................. 713/156 |
| 2004/0202171 | A1 | * | 10/2004 | Hama ........................ 370/395.1 |
| 2004/0202199 | A1 | * | 10/2004 | Fischer et al. ................ 370/474 |
| 2005/0125692 | A1 | * | 6/2005 | Cox et al. ...................... 713/201 |
| 2005/0169270 | A1 | * | 8/2005 | Mutou et al. .................. 370/390 |
| 2005/0220143 | A1 | * | 10/2005 | DelRegno et al. ............ 370/471 |
| 2006/0028996 | A1 | * | 2/2006 | Huegen et al. ................ 370/252 |
| 2006/0173831 | A1 | * | 8/2006 | Basso et al. ...................... 707/3 |
| 2007/0280258 | A1 | * | 12/2007 | Rajagopalan et al. ..... 370/395.3 |
| 2008/0049621 | A1 | * | 2/2008 | McGuire et al. ........... 370/236.2 |
| 2008/0098472 | A1 | * | 4/2008 | Enomoto et al. ................ 726/12 |
| 2008/0244741 | A1 | * | 10/2008 | Gustafson et al. .............. 726/23 |

OTHER PUBLICATIONS

NCI-Frederick, "Virtual Private Networking (VPN)—Introduction", 1998-2005, NCI-Frederick Communications.*
Duffy, "Framework for IPsec Protected Virtual Links for PPVPNs", Oct. 2002.*
Alsina, "Setting up VPNs easily with CIPE", Sep. 2003.*
Cisco Systems, "VPN Access Control Using 802.1X Authentication", 2003-2006.*

(Continued)

*Primary Examiner* — O. C. Vostal (57) ABSTRACT

An access interface system for interfacing between an enterprise network and a service provider network comprises an interface and a processing system. The interface is configured to receive traffic from the service provider network wherein the traffic identifies a virtual link and a media access control address, transmit the traffic to the enterprise network if the media access control address is allowed for the virtual link, and block the traffic if the media access control address is not allowed for the virtual link. The processing system is configured to determine if the media access control address is allowed for the virtual link.

15 Claims, 7 Drawing Sheets

(56) References Cited

OTHER PUBLICATIONS

Choi, "Enhancement of a WLAN-Based Internet Service in Korea", 2003.*
Sultan et al., "An example of VPN server spoofing", 2004-2005.*
Vacca, "Guide to Wireless Network Security", 2006.*
International Telegraph and Telephone Consultative Committee, "CCITT I.311", "Overall Network Aspects and Functions, ISDN User-Network Interfaces", 1991.*
Abou-Gabal et al., "IS-IS Protocol Hardware Implementation for VPN Solutions".*
Hernandez-Vlaencia et al., "Managed Virtual Private LAN Services", 2003.*
Carugi et al., "Virutal Private Network Services: Scenarios, Requirements and Architectural Constructs from a Standardization Perspective", 2004.*
Metz, "The Latest in Virtual Private Networks: Part I", 2003.*
Rekhter et al., "Address Allocation for Private Internets", RFC 1918, 1996.*
Bux et al., "Technologies and Building Blocks for Fast Packet Forwarding", 2001.*

* cited by examiner

MEDIA ACCESS CONTROL ADDRESS SECURITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunications, an in particular, to traffic security over virtual links provided between enterprise sites by service providers.

2. Description of the Prior Art

Telecommunication service providers often times provide communication links over core telecommunication network between multiple enterprise locations. For example, a bank customer could obtain a virtual private network from a service provider in order to link the data operations disparate bank locations or branches. Internet protocol (IP), frame relay, multiprotocol label switching (MPLS), and other protocols are used to access VPNs and carry traffic over the service provider networks.

Security is an important concern to VPN customers. Typically, firewalls are placed between enterprise networks and access or service carriers to protect the enterprise networks from unauthorized access. In one example, firewalls filter incoming and outgoing traffic based on network address, media access control addresses (MACs), and data types.

One problem with virtual private networks is that traffic from multiple customers is carried over a common network. In addition, VPNs can be mis-provisioned. For example, access equipment at one customer site could be mis-provisioned to send traffic on the VPN of another customer, rather than the VPN assigned to the one customer. As a result, traffic is frequently routed to the wrong customer.

Presently, most current security measures do not account for a situation wherein a VPN is mis-provisioned. For instance, once traffic originating from one customer network is allowed by the network firewall and transmitted over a VPN belonging to another customer, the access equipment on the terminating end of the VPN will typically allow the traffic based on the assumption that traffic receiving over a secure VPN is itself secure. As a result, customer traffic belonging to one customer will be routed to the network of another customer.

SUMMARY OF THE INVENTION

An embodiment of the invention helps solve the above problems and other problems by filtering traffic incoming from a service network over a virtual link to a destination in an enterprise network by checking the media access control address identified in the traffic against an authorized list of MAC addresses for the virtual link. In this manner, traffic that is received over a VPN is not automatically assumed to be authorized or secure traffic and mistakes in the link provisioning process can be rectified.

In an embodiment, a method of operating an access interface system for interfacing between an enterprise network and a service provider network comprises receiving traffic from the service provider network wherein the traffic identifies a virtual link and a media access control address, determining if the media access control address is allowed for the virtual link, transmitting the traffic to the enterprise network if the media access control address is allowed for the virtual link, and blocking the traffic if the media access control address is not allowed for the virtual link.

In an embodiment, determining if the media access control address is allowed for the virtual link comprises checking the media access control address against an access control list wherein the access control list identifies the virtual link and a group of media access control addresses associated with the virtual link.

In an embodiment, the media access control address is allowed if the media access control address is in the group.

In an embodiment, the method further comprises providing access to the access control list to an operator of the enterprise network.

In an embodiment, the method further comprises the operator of the enterprise network modifying the access control list.

In an embodiment, modifying the access control list comprises adding a one media access control address to the group.

In an embodiment, modifying the access control list comprises removing a one media access control address from the group.

In an embodiment, the traffic identifies an originating network and wherein the method further comprises if the media access control address is not allowed then providing a notification to the originating network identifying the media access control address.

In an embodiment, an access interface system for interfacing between an enterprise network and a service provider network comprises an interface and a processing system. The interface is configured to receive traffic from the service provider network wherein the traffic identifies a virtual link and a media access control address, transmit the traffic to the enterprise network if the media access control address is allowed for the virtual link, and block the traffic if the media access control address is not allowed for the virtual link. The processing system is configured to determine if the media access control address is allowed for the virtual link.

In an embodiment, a software product comprises software operational when executed by a processing system to direct the processing system to receive traffic from a service provider network wherein the traffic identifies a virtual link and a media access control address, determine if the media access control address is allowed for the virtual link, transmit the traffic to an enterprise network if the media access control address is allowed for the virtual link, and block the traffic if the media access control address is not allowed for the virtual link. The software product further comprises a storage medium configured to store the software.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
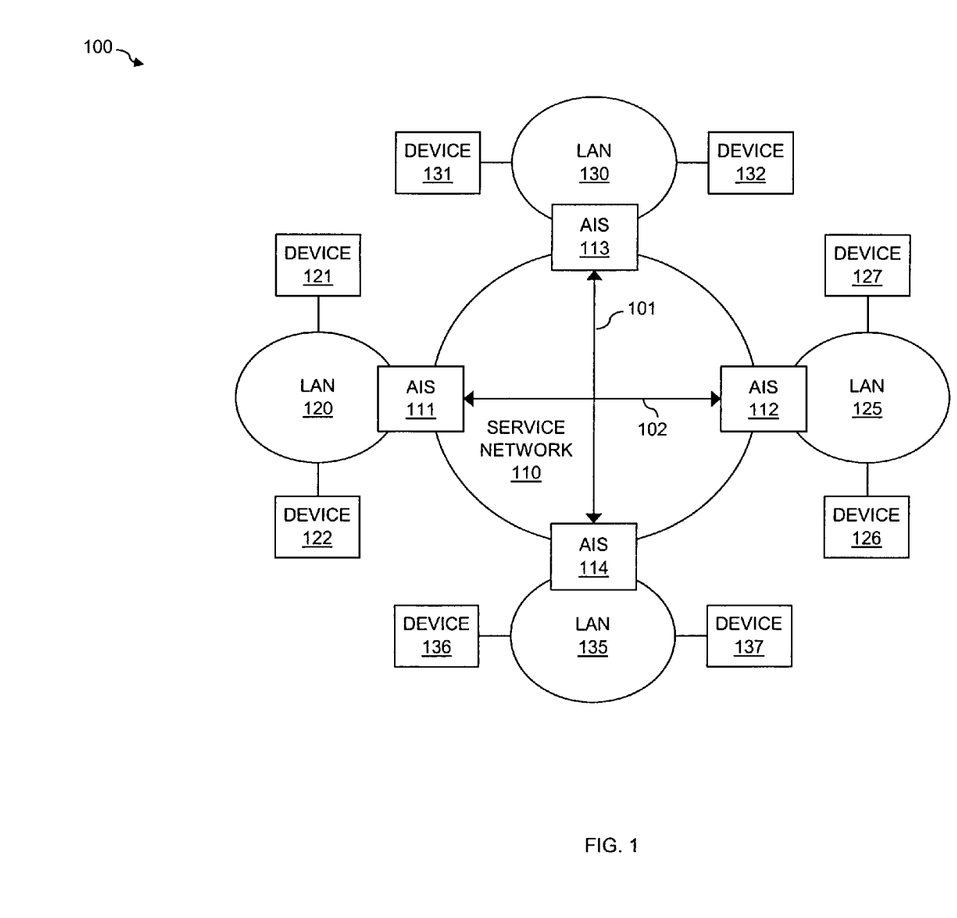
FIG. 1 illustrates a communication network in an embodiment of the invention.

FIG. 1 illustrates communication network 100 in an embodiment of the invention. Communication network 100 includes service network 110 coupled to local area networks (LAN) 120, 120, 130, and 135. LAN 120 is coupled to service network 110 by access interface system (AIS) 111. LAN 125 is coupled to service network 110 by AIS 112. LAN 130 is coupled to service network 110 by AIS 113. LAN 135 is coupled to service network 110 by AIS 114. LAN 120 is coupled to devices 121 and 122. LAN 125 is coupled to devices 126 and 127. LAN 130 is coupled to devices 131 and 132. LAN 135 is coupled to devices 136 and 137.

It should be understood that intermediate networks could exist between LANS 120, 125, 130, and 135 and service network 110. Service network 110 could be comprised of a network or collection of networks capable of providing virtual private network (VPN) service to multiple enterprises operating LANs 120, 125, 130, and 135. In this embodiment, LAN 120 and LAN 125 are operated by a first enterprise and are coupled together by VPN 102. LAN 130 and LAN 135 are operated by a second enterprise that is a different enterprise than the first enterprise. LAN 130 and LAN 135 are coupled by VPN 101. VPNs 101 and 102 are virtual links or tunnels well known in the art. Access interface systems (AIS) 111, 112, 113, and 114 are any type of customer premises equipment capable of originating or terminating VPN traffic.

In operation, devices 121 and 122 transmit and receive traffic over LAN 120. Traffic having a destination within LAN 120 is routed within LAN 120. Traffic having a destination outside of LAN 120 is routed over LAN 120 to AIS 111. Some traffic could be transmitted over a public route, such as the public Internet. Traffic destined for device 126 or 127 could be transmitted over VPN 102 to LAN 125. Likewise, devices 126 and 127 transmit and receive traffic over LAN 125. Traffic having a destination within LAN 125 is routed within LAN 125. Traffic having a destination outside of LAN 125 is routed over LAN 125 to AIS 112. Some traffic could be transmitted over a public route, such as the public Internet. Traffic destined for device 121 or 122 could be transmitted over VPN 102 to LAN 120.

Further in operation, devices 131 and 132 transmit and receive traffic over LAN 130. Traffic having a destination within LAN 130 is routed within LAN 130. Traffic having a destination outside of LAN 130 is routed over LAN 130 to AIS 113. Some traffic could be transmitted over a public route, such as the public Internet. Traffic destined for device 136 or 137 could be transmitted over VPN 101 to LAN 135. Likewise, devices 136 and 137 transmit and receive traffic over LAN 135. Traffic having a destination within LAN 135 is routed within LAN 135. Traffic having a destination outside of LAN 135 is routed over LAN 135 to AIS 114. Some traffic could be transmitted over a public route, such as the public Internet. Traffic destined for device 131 or 132 could be transmitted over VPN 101 to LAN 130.

Figure 2:
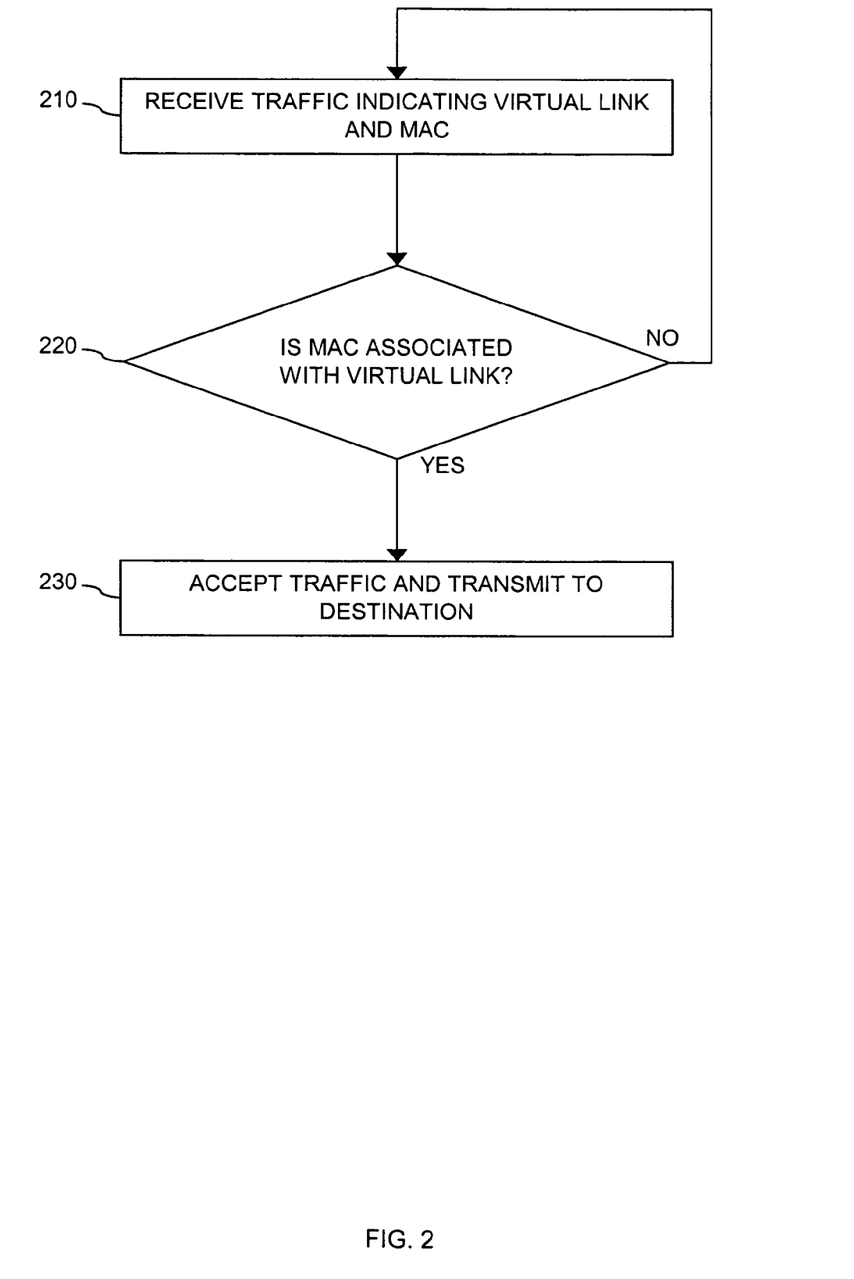
FIG. 2 illustrates the operation of an access interface system in an embodiment of the invention.

FIG. 2 illustrates the operation of any one of AISs 111, 112, 113, and 114. To begin, the AIS receives traffic from service network 110 over a virtual link, such as VPN 101 or VPN 102 (Step 210). The traffic could identify the virtual link and a media access control (MAC) address of a device along the path between the AIS and the originating device. The AIS next determines if the MAC address is associated with the identified link (Step 220). If so, the traffic is accepted and transmitted to the LAN for eventually routing to its destination (Step 230). If not, the traffic is blocked or rejected and the process continues for the next traffic.

In an embodiment, the AIS checks the MAC address against an access control list (ACL) stored in the AIS. The ACL could include a list of virtual links and groups of MAC addresses associated with the virtual links. The groups of MAC addresses could be considered allowed addresses. If the MAC address identified by the incoming traffic is on the list associated with the virtual link identified by the incoming traffic, the traffic could be considered allowed. If the MAC address is not on the list, the traffic could be considered not allowed. In one example, if the MAC address is not allowed, the originating network of the traffic could be notified of the error.

The ACL could be a data file stored in memory of the AIS. The ACL could be remotely accessible by an operator of a LAN. In an embodiment, the ACL could be modified by an operator. For example, an operator could access the ACL to add or remove MAC addresses from the ACL.

It should be understood that the process illustrated in FIG. 2 could be executed in the reverse direction. Namely, an access interface system could receive traffic from a LAN indicating another remote LAN as its destination. In such a case, the access interface system could determine that the traffic requires transport over a virtual link. The MAC address of the system originating the traffic could be checked against an access control list prior to loading the traffic onto the virtual link. If the MAC is approved, the traffic could be accepted and transmitted over the virtual link to the destination LAN. If not, the traffic could be rejected.

Figure 3:
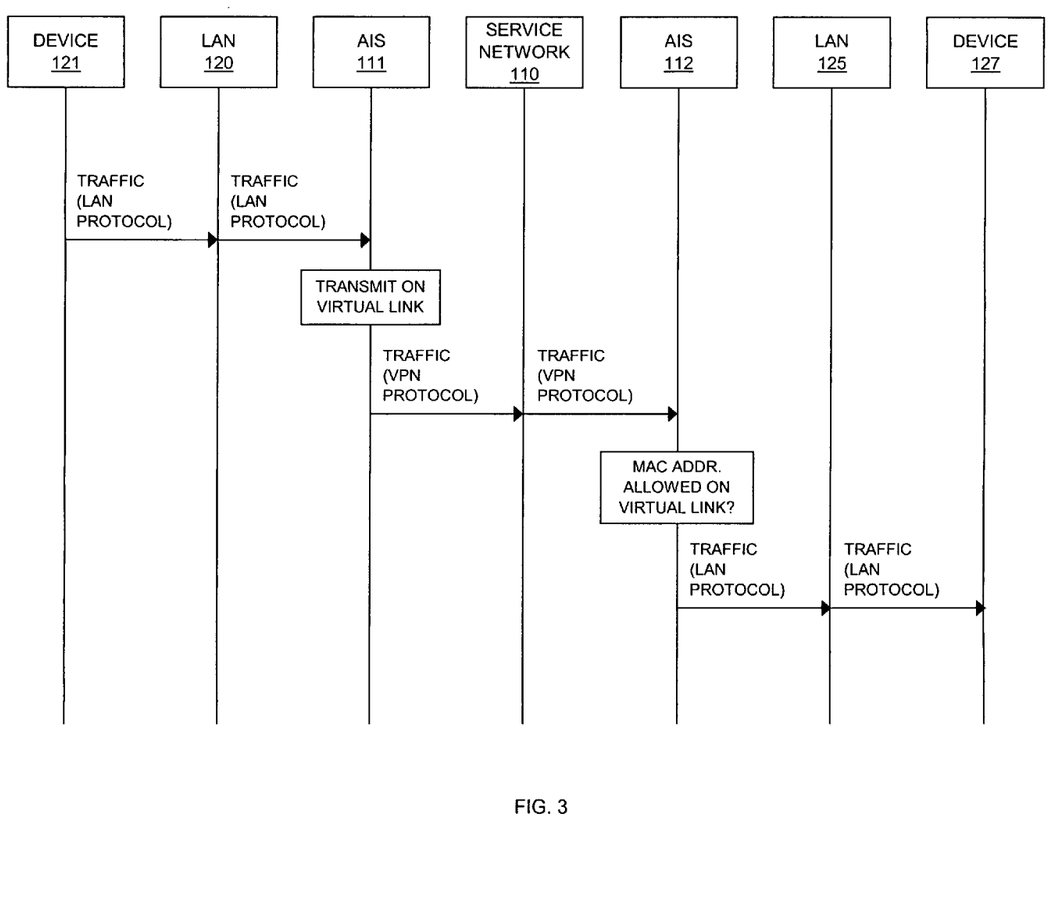
FIG. 3 illustrates the operation of a communication network in an embodiment of the invention.

FIG. 3 illustrates a flow diagram in an embodiment of the invention. In this example, device 121 transmits traffic to device 127 over VPN 102. To begin, device 121 transmits traffic in a LAN protocol over LAN 120 to AIS 111. In this embodiment, device 121 has a MAC address that is unique to device 121. Generally, the MAC address is utilized for providing device 121 with access to LAN 120. In an example, LAN 120 could be an Ethernet based LAN. Thus, the traffic transmitted from device 121 to AIS 111 over LAN 120 identifies the MAC address of device 121.

AIS 111 receives and processes the traffic to place the traffic in a VPN protocol. In this embodiment, the MAC address of device 121 is preserved within the traffic in the VPN protocol. AIS 111 transmits the traffic in the VPN protocol over service network 110 to AIS 112. The traffic identifies both the MAC address of device 121 and VPN 102. For example, a header in the packets comprising the traffic could identify VPN 102 while the MAC address of device 121 could be included in the payload portion of the packets.

Upon receiving the traffic, AIS 112 processes the traffic to determine if the MAC address indicated by the traffic is allowed for the virtual link identified by the traffic. In this case, AIS 112 accesses a data table containing a listing of virtual links and the associated MAC addresses allowed for the virtual links. Further in this case, device 121 is allowed on VPN 102. Therefore, AIS 112 transmits the traffic in a LAN protocol to device 127.

Figure 4:
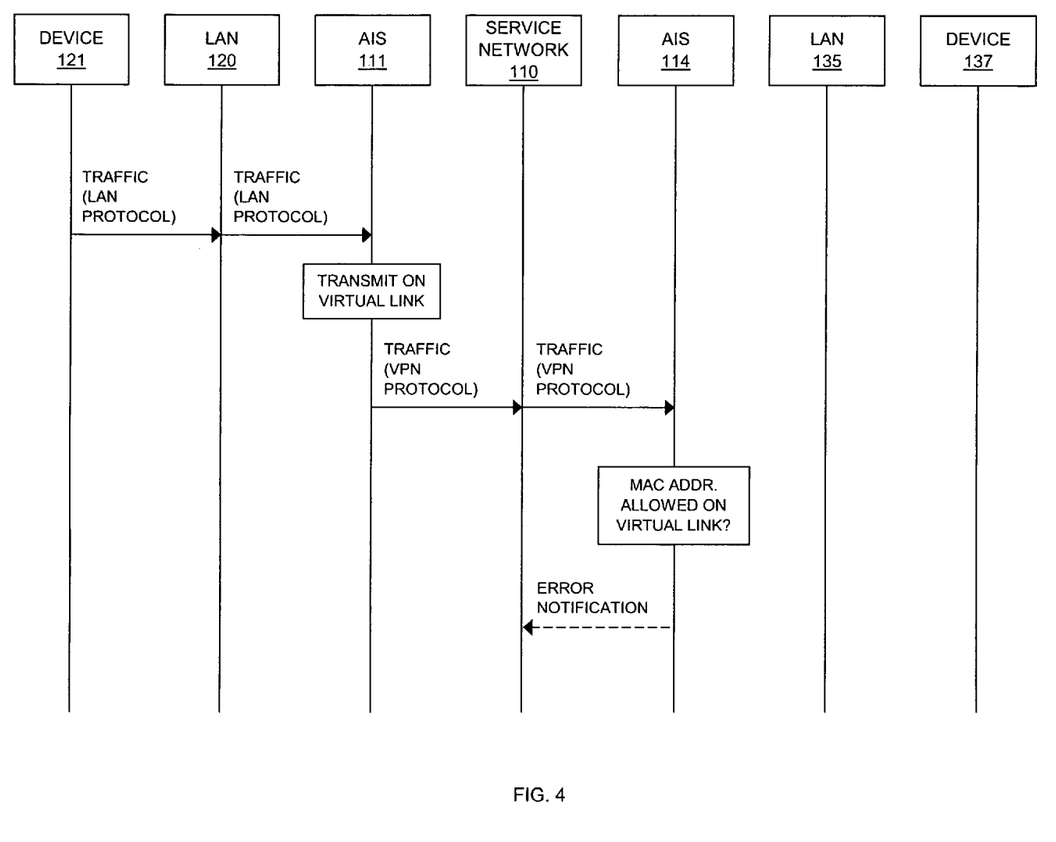
FIG. 4 illustrates the operation of a communication network in an embodiment of the invention.

FIG. 4 illustrates a flow diagram in an embodiment of the invention. In this example, AIS 111 has been mistakenly provisioned to load traffic from LAN 120 onto VPN 101, rather than VPN 102. As a result, traffic transmitted from device 121 to device 127 is sent over VPN 101 to LAN 135 or LAN 130, rather than to LAN 125. In this example, the operation of AIS 114 is described, but could be applied to AIS 113.

To begin, device 121 attempts to transmit traffic to device 127 over VPN 102. Initially, device 121 transmits traffic in a LAN protocol over LAN 120 to AIS 111. In this embodiment, device 121 has a MAC address that is unique to device 121. Generally, the MAC address is utilized for providing device 121 with access to LAN 120. In an example, LAN 120 could be an Ethernet based LAN. Thus, the traffic transmitted from device 121 to AIS 111 over LAN 120 identifies the MAC address of device 121.

AIS 111 receives and processes the traffic to place the traffic in a VPN protocol. In this embodiment, the MAC address of device 121 is preserved within the traffic in the VPN protocol. AIS 111 transmits the traffic in the VPN protocol over service network 110. If provisioned correctly, the traffic would be transmitted over VPN 102 to AIS 112. However, due to an error in the provisioning process, AIS 112 actually loads the traffic onto VPN 101 and transmits the traffic over service network 110 to AIS 114. In this case, the traffic identifies both the MAC address of device 121 and VPN 101. For example, a header in the packets comprising the traffic could identify VPN 101 while the MAC address of device 121 could be included in the payload portion of the packets.

Upon receiving the traffic, AIS 114 processes the traffic to determine if the MAC address indicated by the traffic is allowed for the virtual link identified by the traffic. In this case, AIS 114 accesses a data table stored in memory containing a listing of virtual links and the associated MAC addresses allowed for the virtual links. Further in this case, the MAC address for device 121 is not in the group of MAC addresses allowed on VPN 101. Therefore, AIS 114 blocks the traffic arriving from device 121. Optionally, AIS 114 could automatically generate and transmit a notification to an administrator of LAN 120.

In a testing example, an enterprise customer could utilize an access interface system as described above to troubleshoot the performance of multiple LANs. For example, an enterprise customer could operate LAN 135 and LAN 130. As illustrated in FIG. 1, LAN 135 is coupled to LAN 130 over VPN 101. AIS 114 could log the originating MAC address of traffic transmitted from LAN 135 over VPN 101. Likewise, AIS 113 could log the originating MAC address of traffic received over VPN 101. In the event of a network problem in LAN 130, the outgoing log created by AIS 114 could be compared to the incoming log created by AIS 113 to determine whether or not the network problem exists in service network 110 or within LAN 130 itself. In the reverse direction, AIS 113 could log the originating MAC addresses of traffic transmitted from LAN 130 over VPN 101. In return, AIS 114 could log the originating MAC addresses of traffic received on VPN 101. In the event of a problem, the outgoing log created by AIS 113 could be compared to the incoming log created by AIS 114 to determine whether the problem exists in service network 110 or within LAN 135 itself. Remote access could be provided to both AIS 113 and AIS 114 to view the logs created by both access interface systems.

Figure 5:
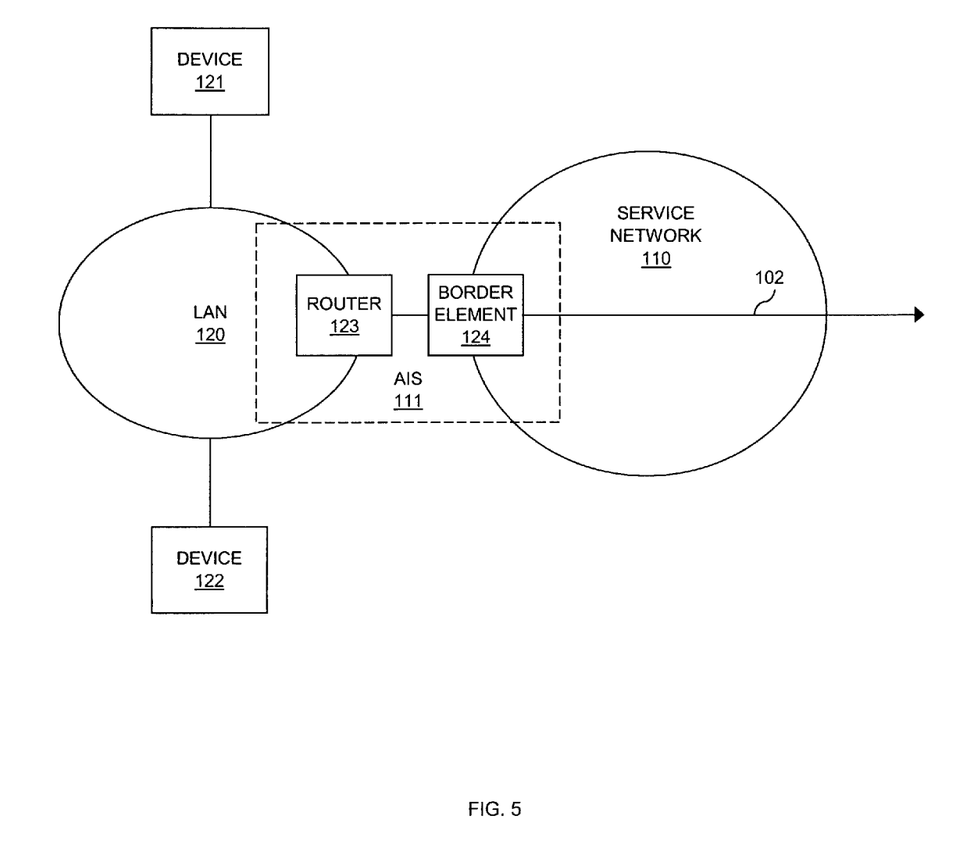
FIG. 5 illustrates a portion of a communication network in an embodiment of the invention.

FIG. 5 illustrates a portion of communication network 100 in an embodiment. In particular, FIG. 5 illustrates LAN 120 coupled to service network 110 by AIS 111. AIS 111 is further illustrated as including router 123 and 124. Typically, router 123 provides a first point of ingress of a last point of egress for traffic coming into and leaving LAN 120. Border element 124 likewise provides a first point of ingress or a last point of egress for traffic to and from service network 110.

In an embodiment, border element 124 aggregates traffic received over service network 110 from other LANs that is destined for LAN 120. In general, the traffic is received over VPNs, such as VPN 102. In this embodiment, border element 124 includes an access control list as described above. The ACL includes a list of VPNs and groups of MAC addresses associated with the VPNs respectively. Further in this embodiment, border element 124 is located in service network 110. Border element 124 could include a user interface that provides remote access to personal within LAN 120.

Figure 6:
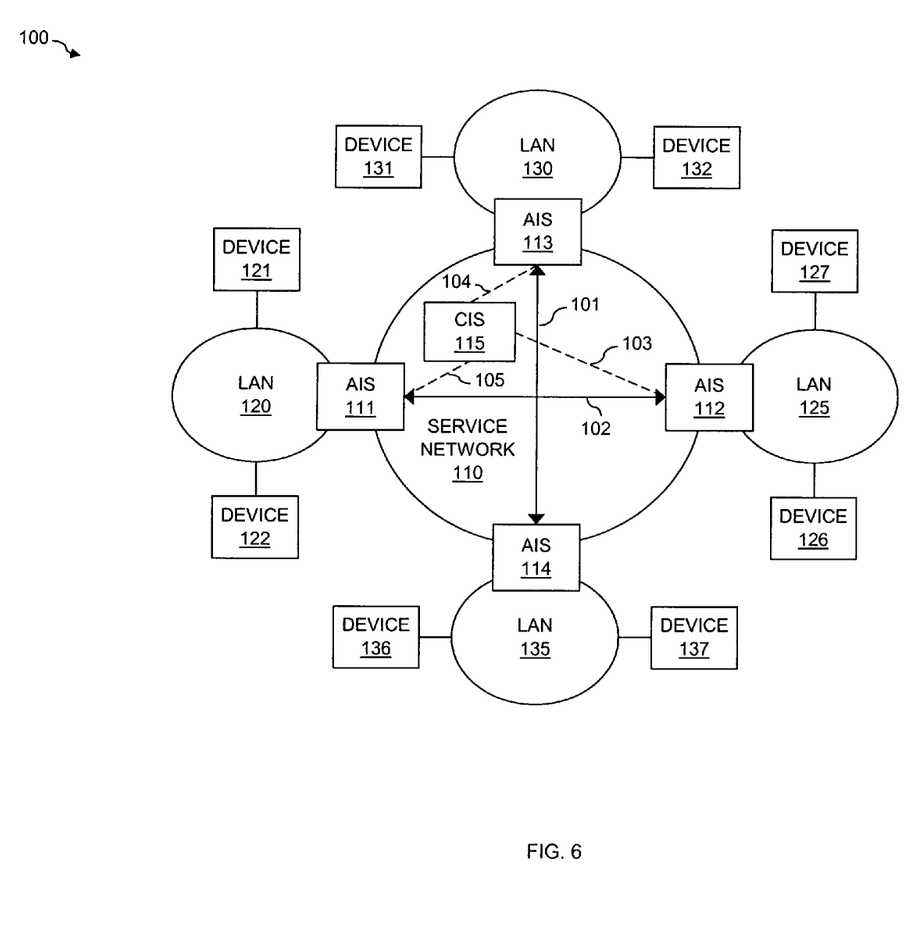
FIG. 6 illustrates a communication network in an embodiment of the invention.

FIG. 6 illustrates communication network 100 in an embodiment, with the addition of customer interface system (CIS) 115. In this embodiment, CIS 115 is in communication with AIS 111, 112, 113, and 114 over data connections 103, 104, and 105. CIS 115 could include a user interface remotely accessible by enterprise personnel. Through CIS 115, AIS 111, 112, 113, and 114 could be remotely controlled. For example, the ACL stored in each AIS 111, 112, 113, and 114 could be remotely modified by adding or removing MAC addresses from the various VPN groups stored in ACLs.

Advantageously, filtering traffic incoming from a service network over a virtual link to a destination in an enterprise network by checking the media access control address identified in the traffic against an authorized list of MAC addresses for the virtual link improves the ability to determine that traffic that is received over a VPN is not automatically assumed to be authorized or secure traffic. In a further advantage, mistakes in the link provisioning process can be rectified.

Computer System

Figure 7:
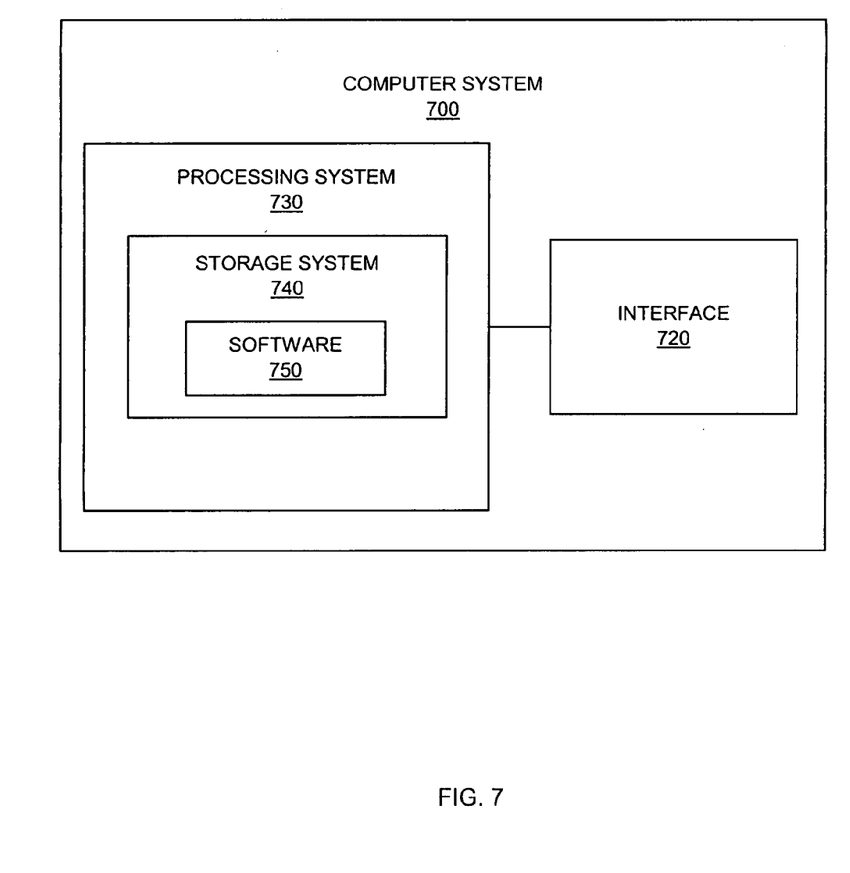
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Interface 720 may be distributed among multiple communication devices. Processing system 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for access interface systems 111, 112, 113, and 114.

What is claimed is:

1. A method of operating an access interface system to interface between a local area network and a service provider network, the method comprising:
   receiving data traffic transmitted from an originating device over a virtual private network (VPN), wherein the data traffic contains a media access control (MAC) address of a device along a path between the access interface system and the originating device;
   determining if the MAC address is associated with the VPN;
   transmitting the data traffic to the local area network if the MAC address is associated with the VPN; and
   blocking the data traffic from transfer to the local area network if the MAC address is not associated with the VPN.

2. The method of claim 1 wherein determining if the MAC address is associated with the VPN comprises checking the MAC address against an access control list, wherein the access control list identifies the VPN and a group of MAC addresses associated with the VPN.

3. The method of claim 2 wherein the MAC address is associated with the VPN if the MAC address is in the group of MAC addresses associated with the VPN.

4. The method of claim 2 further comprising allowing an operator of the local area network to modify the access control list.

5. The method of claim 1 wherein the data traffic identifies an originating network and wherein the method further comprises if the MAC address is not allowed then providing a notification to the originating network identifying the MAC address.

6. An access interface system to interface between a local area network and a service provider network, the access interface system comprising:
   a communication interface configured to receive data traffic transmitted from an originating device over a virtual private network (VPN), wherein the data traffic contains a media access control (MAC) address of a device along a path between the access interface system and the originating device; and
   a processing system comprising circuitry configured to determine if the MAC address is associated with the VPN, and if the MAC address is associated with the VPN, direct the communication interface to transmit the data traffic to the local area network, and if the MAC address is not associated with the VPN, direct the communication interface to block the data traffic from transfer to the local area network.

7. The access interface system of claim 6 wherein the processing system configured to determine if the MAC address is associated with the VPN comprises the processing system configured to check the MAC address against an access control list, wherein the access control list identifies the VPN and a group of MAC addresses associated with the VPN.

8. The access interface system of claim 7 wherein the MAC address is associated with the VPN if the MAC address is in the group of MAC addresses associated with the VPN.

9. The access interface system of claim 7 further comprising the processing system configured to allow an operator of the local area network to modify the access control list.

10. The access interface system of claim 6 wherein the data traffic identifies an originating network and wherein if the MAC address is not allowed then the processing system is configured to provide a notification to the originating network identifying the MAC address.

11. A communication system comprising:
    a first node coupled to a first network and configured to transfer data traffic for delivery to a second network over a virtual private network (VPN) link provided through a service provider network;
    an access interface system configured to receive the data traffic from the service provider network over the VPN link, wherein the data traffic contains a media access control (MAC) address of a device along a path between the access interface system and the first node;
    the access interface system configured to process the MAC address to determine if the data traffic is associated with the VPN link; and
    the access interface system configured to transfer the data traffic to the second network if the data traffic is associated with the VPN link, and block the data traffic from transfer to the second network if the MAC address is not associated with the VPN link.

12. The communication system of claim 11 wherein the access interface system configured to process the MAC address to determine if the data traffic is associated with the VPN link comprises the access interface system configured to check the MAC address against an access control list, wherein the access control list identifies the VPN and a group of MAC addresses associated with the VPN.

13. The communication system of claim 12 wherein the MAC address is associated with the VPN if the MAC address is in the group of MAC addresses associated with the VPN.

14. The communication system of claim 12 further comprising allowing an operator of the local area network to modify the access control list.

15. The communication system of claim 11 wherein the data traffic identifies an originating network and wherein if the MAC address is not allowed then the access interface system is configured to provide a notification to the originating network identifying the MAC address.

* * * * *